March 16, 1926.  
J. O'KELLY  
ANIMAL TRAP  
Filed April 28, 1925
1,576,841
2 Sheets-Sheet 1
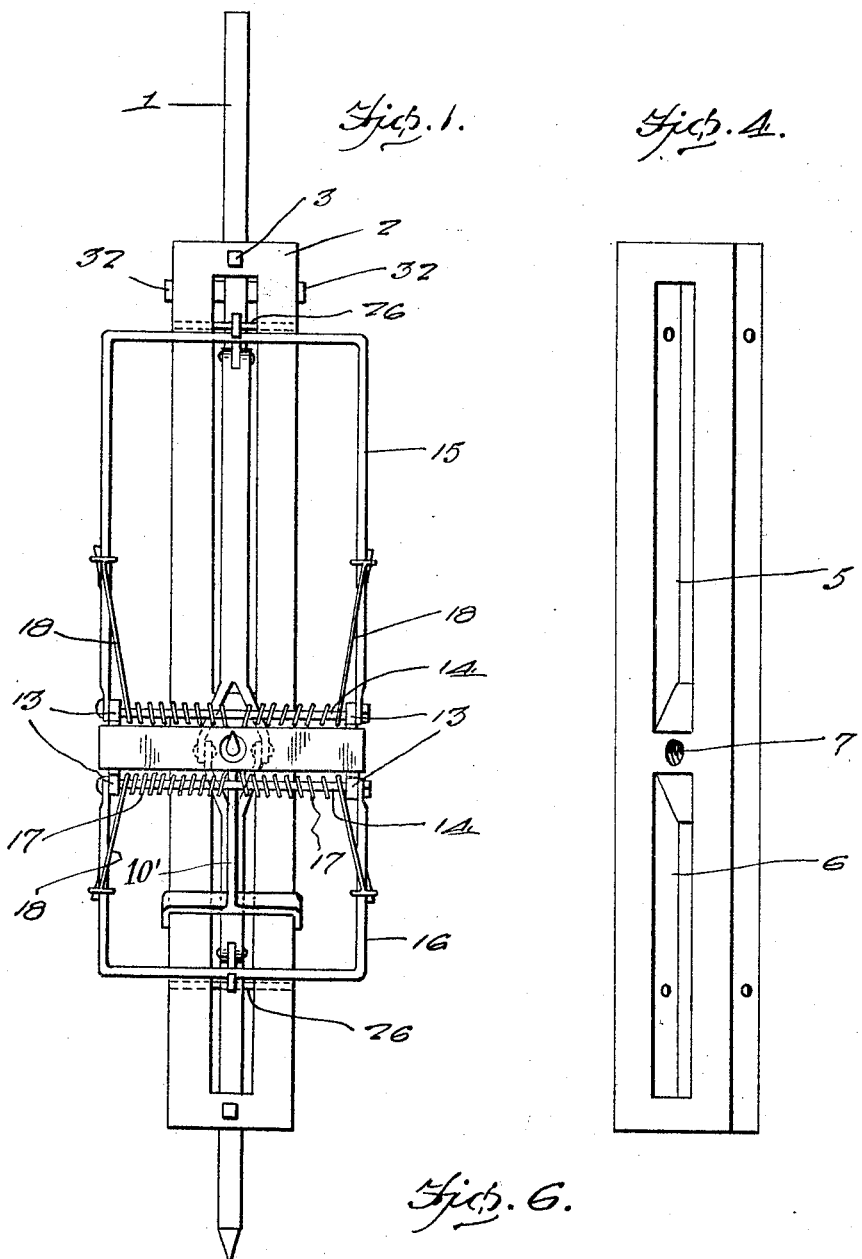
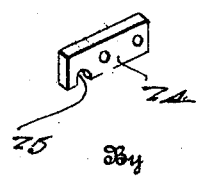
Inventor  
J. O'Kelly

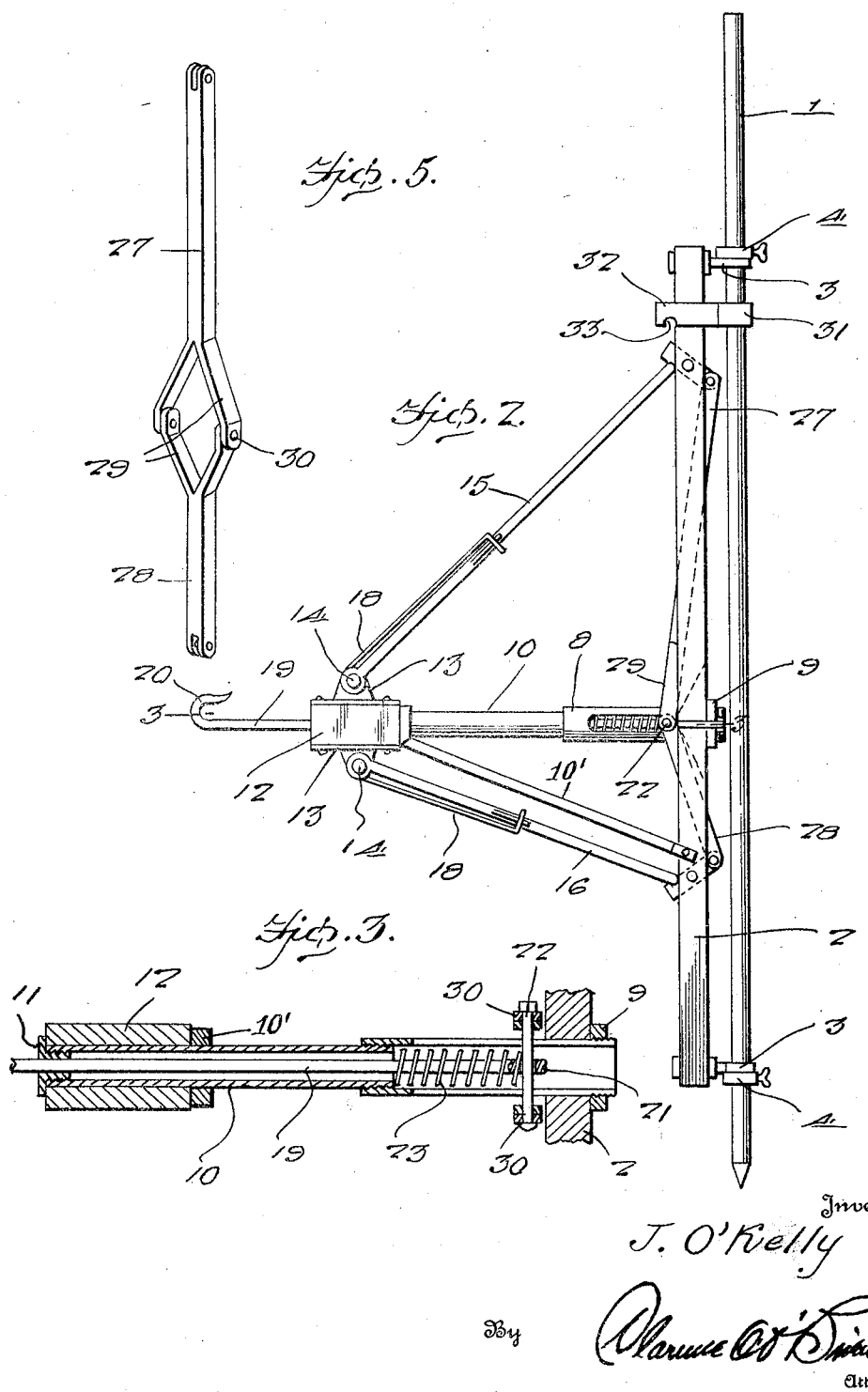

Patented Mar. 16, 1926.

1,576,841

UNITED STATES PATENT OFFICE.

JAMES O'KELLY, OF SILVERTON, COLORADO.

ANIMAL TRAP.

Application filed April 28, 1925. Serial No. 26,412.

*To all whom it may concern:*

Be it known that I, JAMES O'KELLY, a citizen of the United States, residing at Silverton, in the county of San Juan and State of Colorado, have invented certain new and useful Improvements in Animal Traps, of which the following is a specification.

This invention relates to improvements in animal traps, and particularly traps for catching larger sized animals.

An object of the invention is to provide a vertically mounted trap having a substantially vertically arranged base member to which is attached suitable structure for mounting the bait hook and trigger members for the jaws operated on horizontal pivots in front of the base member.

Another object of the invention is to provide a vertically disposed base member having a standard mounted therein and projecting laterally from the central portion to provide a mounting for horizontally swinging jaws which are held by suitable setting mechanism at the end portions of the base member and released, when a pull is exerted on the bait hook carried by the laterally projecting member.

The invention further comprehends other objects and improvements in the details of construction and arrangement of the parts, which are more particularly pointed out in the following detailed description and in the claims directed to a preferred form of the invention, it being understood, however, that various changes in the size, shape and form of the several parts making up this trap may be made, as found desirable in the practical embodiments of the apparatus, without departing from the spirit and scope of the invention, as herein set forth.

In the drawings, forming part of this application:

Figure 1 is a front elevational view of the trap in set position.

Figure 2 is a side elevation of the trap in set position as illustrated in Figure 1.

Figure 3 is a detail horizontal sectional view, taken on the line 3—3 of Figure 2, and on a substantially enlarged scale.

Figure 4 is a detail perspective view of the base plate.

Figure 5 is a detail perspective view showing the manner of connecting the pawl or latch members for operation by the bait hook to operate said latch or pawl members to release the jaw members.

Figure 6 is a detail perspective view of one of the latch or pawl members.

A supporting pole or bar member is indicated at 1, on which is mounted the base member 2 of the trap, secured to the bar member 1 by suitable eye members 3 and held in a set position on the bar members 1 by the collars 4, which are adapted for adjustment on said bar member as desired. The base member 2 is formed with a pair of aligned slots 5 and 6 respectively, between which said base member is provided with a threaded opening 7 which receives a slotted tube 8 which is secured therein and locked by a lock nut 9. In the outer end of the sleeve member 8 is mounted a pipe section 10, extending outwardly from the front face of the base member 2 and which mounts at the outer end thereof a bearing plug 11 and a jaw supporting sleeve 12. A bracket member 10' extends in angular relation between the base member 2 and the outer end of the pipe section 10 for insuring the rigid support of the plate member and bar 12 relative to the base member. Bracket members 13 are mounted on the upper and lower sides of said jaw supporting member 12 and carry bearing extensions which receive the rods 14, on which are pivotally mounted the U-shaped jaw members 15 and 16 respectively. Coil springs 17 are mounted on each of the rods 14, in pairs and have their extensions 18 for engagement with the end portions of each jaw member 15 and 16 as clearly disclosed in the drawings. These spring members operate to provide the proper tension for operating the jaws 15 and 16 to engage the neck or body of an animal to be caught and retain said animal therebetween.

A base bar is provided at 19 which slidably extends through the bearing block 11, the pipe section 10 and into the slotted sleeve 8 and at the outer end is formed with a bait hook 20. The end of the bait bar 19 within the slotted sleeve 8 is provided with an eye 21, through which extends an elongated bolt 22, slidably fitting in and extending through the slot of the sleeve member 8. A coil spring 23 is interposed between the end of the pipe section 8 and the bolt member 22 and is normally held under tension to force the bait rod 19 rearwardly through the sleeve 8 and retain the same in the position illustrated in Figure 3.

Jaw holding latches 24, formed with notches 25 to receive the jaws are pivotally mounted intermediate their ends on pins 26, in the end portions of the base member, so that the jaw latches 24 are mounted in the outer ends of the slots 5 and 6 respectively. A pair of such latches are arranged in opposed relation, as illustrated in the slots 5 and 6, as above set forth, and have operating links 28 and 27 pivotally connected to the ends thereof, opposite the pivot from the end formed with the notch 25, as clearly illustrated in Figure 2 and serving to control the operation of these latch members in holding or releasing the jaw members. The operating members 27 and 28 are provided with forked ends 29 which are pivotally connected together at their free ends as indicated at 30, by the elongated bolt 22, extending through the base bar 19.

For the purpose of setting the trap, a bar member is slidably mounted on the rod 1, as indicated at 31, having end extensions 32, provided with notches 33 for engagement with the upper jaw member 15. This bar member 31 has a frictional sliding movement on the bar or rod 1, so that it may be retained by friction in raised position out of engagement with the jaw 15 and manually moved down to engage the jaw in the said position as shown in Figure 2, for holding said jaw, while the jaw 16 and the latch member 24 are moved to locking position to hold the trap set ready for operation to catch an animal.

Bait is applied to the hook 20 and the bar member 1 driven in the ground or attached to a suitable tree or any other supporting structure, in order to provide a mounting for the trap, so that it will hold the animal, when caught therein.

The coil spring 23 moves the bait bar 19 rearwardly in the sleeve 8 so that the operating links 27 and 28 for the latch members 24 will move the free ends of the latch members having the notches 25 therein, toward each other, so that when the jaws 15 and 16 are moved to the position shown in Figure 2, they will engage in the notches 25 and be held therein by the latch members and the operating members which hold said latch members in this position, through the operation of the coil spring 23. It will then be seen that should an animal eating the bait on the hook 20 pull the same to move the rod 19 outwardly through the sleeve 8, it will draw the bolt 22 outwardly and compress the coil spring 23, which will move the latch members 24 on their pivots and disengage said latch members from the jaws 15 and 16 and permit the operation thereof under the tension of the coil spring 17. This will immediately operate to move the jaws to engage the neck or body of the animal eating the bait on the hook 20 and through the strength of the springs 17, the animal will be held between the jaws. The base member 1 may be adjusted on the bar 1 to any desired height, according to the size of animal it is desired to catch.

It will thus be seen that a substantially simple and yet efficient trap for catching large animals has been provided, which is readily operable and easily adjusted for setting, and which is not likely to get out of order through continued use.

What is claimed is:

1. A trap comprising a base member adapted for mounting on a suitable support, a hollow projecting member mounted on the central portion of the base member and extending laterally therefrom, a bait rod slidably mounted in said hollow projecting member having a hook on the outer end thereof and carrying a bolt member at the inner end thereof projecting through slots formed in the hollow projecting member, a pair of cooperating jaws hingedly mounted on the outer end of said projecting member, lock members pivotally mounted at the end portions of the base member, and operating links pivotally connected to said bolt member carried by the base bar and the latch member for operating said latch members to engage and lock the jaws in open and set position in a predetermined position of the base bar.

2. A trap comprising a base member formed with a pair of aligned slots, a slotted tubular member secured to the base member between the slots and extending laterally therefrom, a jaw supporting sleeve mounted at the free end of the tubular member, U-shaped jaw members having the ends mounted on a horizontal pivot bar carried by said jaw supporting member, means for operating said jaw members to move the same toward each other for cooperation to grip an animal, a base bar having a hook on the outer end thereof slidably mounted in the tubular member and having a bolt mounted transversely at the inner end thereof and extending through slots in said tubular member, a pair of lock members pivotally mounted in opposed relation in the slots at the opposite end of the base member, said latch members being formed with notches to receive the jaw members, operating bars pivotally connected to the ends of the latch members and formed with forked ends pivotally connected to the transversely extending bolt members carried by the base bar, a coil spring member mounted in the tubular member and normally operative on said bolt member to move the same rearwardly in said tubular member, said latch members in the rearward movement of the bolt member being operated to receive the jaws in the notches formed therein and retain said jaws in open set position, the forward movement of the bolt member in the slots of the tubular member moving the operating rod to operate the latch members for releasing said jaws for operation.

In testimony whereof I affix my signature.

JAMES O'KELLY.